United States Patent [19]

Brixy et al.

[11] 4,278,828
[45] Jul. 14, 1981

[54] NOISE-TEMPERATURE THERMOMETER

[75] Inventors: Heinz Brixy, Niederzier; Helmut Hofer, Korschenbroich, both of Fed. Rep. of Germany

[73] Assignee: Kernforschungsanlage Jülich Gesellschaft mit beschränkter Haftung, Jülich, Fed. Rep. of Germany

[21] Appl. No.: 103,435

[22] Filed: Dec. 14, 1979

[30] Foreign Application Priority Data

Dec. 15, 1978 [DE] Fed. Rep. of Germany ....... 2854227

[51] Int. Cl.³ .......................... G01K 7/30; G01K 7/04
[52] U.S. Cl. .................................. 136/232; 73/359 R; 73/362 AR; 136/230; 338/28
[58] Field of Search .................. 73/359 R, 362 AR; 136/224, 227, 232, 230; 338/28

[56] References Cited

U.S. PATENT DOCUMENTS

| | | | |
|---|---|---|---|
| 1,837,853 | 12/1931 | De Florez | 136/224 |
| 2,012,112 | 8/1935 | States | 136/224 |
| 2,710,899 | 6/1955 | Marsden | 73/362 AR |
| 2,728,835 | 12/1955 | Mueller | 73/342 |
| 2,768,266 | 10/1956 | Marsden | 73/359 R |
| 2,884,786 | 5/1959 | Burk | 73/359 R |
| 3,818,761 | 6/1974 | Brixy | 73/359 R |
| 3,890,841 | 6/1975 | Brixy | 73/359 R |
| 3,956,936 | 5/1976 | Brixy | 73/359 R |
| 3,964,314 | 6/1976 | Brixy | 73/359 R |
| 3,966,500 | 6/1976 | Brixy | 73/359 R |

FOREIGN PATENT DOCUMENTS 2115033 10/1972 Fed. Rep. of Germany .
2263469 10/1975 Fed. Rep. of Germany .
2347765 7/1976 Fed. Rep. of Germany .

*Primary Examiner*—Gerald Goldberg
*Assistant Examiner*—Denis E. Corr
*Attorney, Agent, or Firm*—Karl F. Ross

[57] ABSTRACT

A noise-temperature thermometer is provided with a metal sensing wire, and a ceramic body at one end thereof, the body being formed with passages through which the leads connected to the resistance wire extend, at least one partition being formed in the ceramic body and lying between the ends of the resistance wire connected to the leads.

5 Claims, 20 Drawing Figures

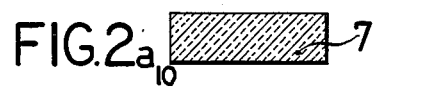
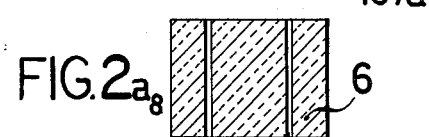
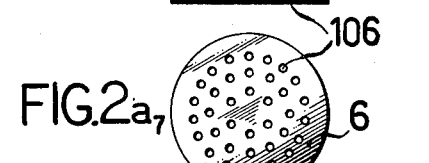
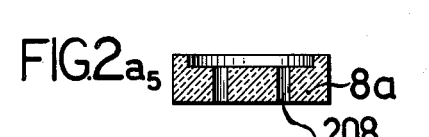
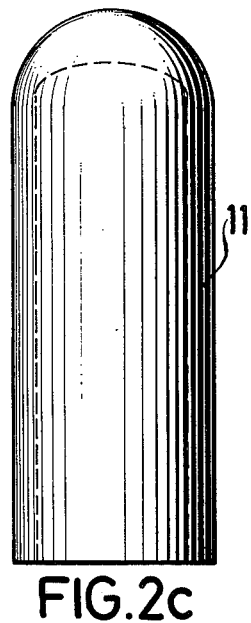
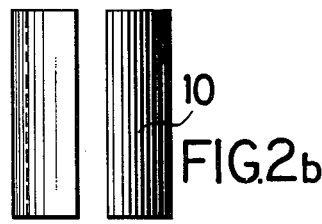
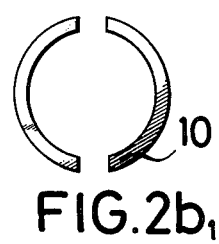
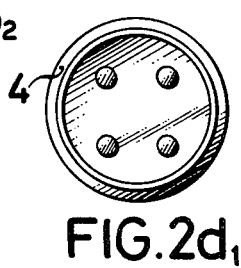

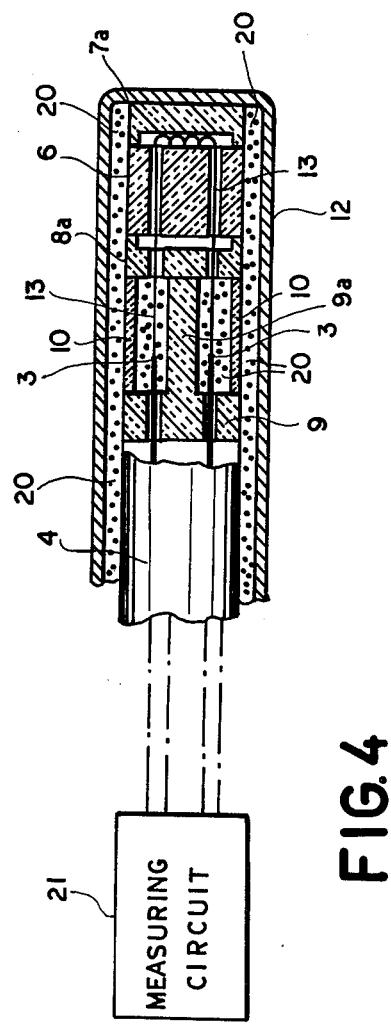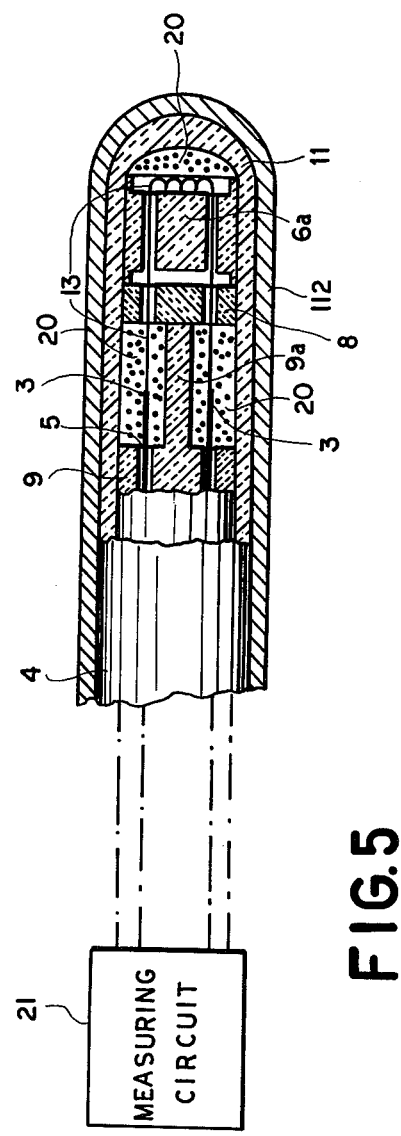

NOISE-TEMPERATURE THERMOMETER

FIELD OF THE INVENTION

The present invention relates to a noise-temperature thermometer and, more particularly, a sensor for generating a noise voltage as a function of temperature which comprises the resistance wire or metal coil to which the leads are connected.

BACKGROUND OF THE INVENTION

For the measurement of temperatures, especially with electrical or electronic instruments, various basic principles have been employed. For example, it is known to measure a temperature by detecting the potential differences or emf produced by a junction of dissimilar metallic and/or semiconductive elements forming a thermocouple or thermopile.

The output of such elements is a voltage which is a function of temperature and hence such temperature sensors can be used for a wide variety of temperature measuring and control purposes.

However, when such thermoelements are used at temperatures above about 1000° C. or when they must be associated with measuring instruments which are to be located in an environment which is hazardous to the sensor, inaccurate results may be obtained, the systems using such elements may be destroyed and considerable error is encountered.

There has been developed a class of temperature measuring which utilizes somewhat different principles to provide an output representing the temperature and which avoids the disadvantages of these earlier systems.

One of these alternative systems is a noise-temperature thermometer or noise-temperature system.

This system utilizes a metallic strand, wire, coil or other elongated conductor which generates an electrical output because of the thermal agitation of electrical charges within the conductor. The output is a noise voltage and is produced in the electrical conductor by thermal agitation, i.e. an increase in the electrical noise is observed with increasing temperature.

Such thermally generated noise in an electrical conductor, also known as Johnson noise, can even be produced at conductor temperatures approaching 0° K. at which thermocouples become inefficient, and at temperatures up to several hundred degrees K. or more, as long as the conductor retains its stability.

The available thermal-noise power is proportional to the absolute temperature over the frequency bandwidth over which the noise is measured. For a fixed bandwidth the available thermal-noise power can be measured in terms of the noise voltage and is proportional to absolute temperature.

For further details on the theory of such systems, the circuitry utilizing same, and the application of the principles of Johnson noise as applied to temperature measurement, reference can be made to U.S. Pat. Nos. 2,710,899, 2,728,835, 2,768,266, 2,884,786, 3,818,761, 3,890,841, 3,956,936, 3,966,500 and the patents, applications and publications cited or mentioned therein.

Reference may also be had to German patent document (Open Application—Offenlegungsschrift) No. 2,115,033 and German Pat. Nos. 2,263,469 and 2,347,765.

From the latter references it is known to provide the sensing element of a noise thermometer with a ceramic support or mounting element in which the metal conductor or wire is mounted and from the ends of which extend leads to the remote circuitry for detecting the noise voltage.

As the above-mentioned publications will also show, the junctions between the metal wire forming the noise resistance and the leads can be provided with thermocouples or other thermoelements defined between two dissimilar metals, each of which has a conductor leading from the sensing head or temperature probe. Thus the probe can comprise a temperature-sensing head at the free end thereof, containing the noise-resistance wire and the junctions and thermocouples, and a cable or like structure leading from this head in the opposite direction and provided with four conductors in two pairs, each pair being connected to a single junction.

The circuitry responsive to the signals delivered by these conductors is fully described in the aforementioned patents.

In the mechanical construction of the noise thermometer or sensor it is known to provide the noise resistance as a coil, meander or other configuration which will ensure a considerable length in a limited volume, e.g. by mounting the coil or meander on, or winding the wire in a number of passes around, a ceramic element disposed in the measuring head. Furthermore, it is known to pack the interior of the sensor with ceramic particles, inter alia, for greater stability.

Notwithstanding the use of a ceramic body to support the noise resistor and a packed construction of the probe, difficulties are encountered which, with experience, we have traced to an unsatisfactory insulation of the junctions from one another and from the electrical elements of the system. Furthermore, problems have been encountered in assembling the probes and in fabricating the units which have led to solutions which also tend to prevent satisfactory insulation and separation of the junctions.

OBJECTS OF THE INVENTION

It is, therefore, an object of the invention to provide a noise-thermometer sensor which will allow the junction between the leads and the noise-resistor wire to be as close as possible to the coil or meander thereof and yet simplify fabrication and assembly of the unit.

Yet another object of the invention is to provide, in a structure of the aforedescribed type, improved electrical separation of the junctions even when the sensor is used in a high temperature environment, e.g. at temperatures above about 1200° C.

It is also an important object of the invention to provide a noise-thermometer sensor which will obviate the disadvantages of earlier temperature probes operating on similar principles, including the disadvantages enumerated above.

Still another object of the invention is to improve the reliability, precision and useful life of a noise-thermometer temperature sensor.

SUMMARY OF THE INVENTION

These objects and others which will become more readily apparent hereinafter are attained, in accordance with the present invention, in a noise-thermometer temperature sensor which provides a structure supporting the noise-resistance element in the form of a wire in coil or meander configuration and adjacent this structure a perforated ceramic body formed with a partition adapted to separate the junctions from one another and formed, in its perforated portions, with bores or passages for the leads connected to the junction. This ceramic insulating body thus has a perforated cylindrical portion at its end turned toward the cable or conductor, i.e. turned away from the sensor end, from which the partition or web reaches toward the body carrying the coil or the meander. The perforated portion can be of disk shape or can be axially elongated and can be formed with four axially extending parallel bores each of which serves to accommodate a respective conductor or lead.

When these conductors are thermoelement wires (dissimilar wires forming a thermocouple at the respective junctions) the web is located between the pairs of bores or passages.

Advantageously, the wires, conductors or leads derive from a cable which is connected to the head and which adjoins the ceramic insulating body. When the latter has a disk-shaped perforated portion, the ratio of the length of the web or partition to the axial dimension of the disk-shaped portion is preferably 3:1.

This insulating body can be formed readily from an extruded ceramic structure which can then be sawn with a diamond saw or slotted therewith to remove a pair of cylindrical segments on opposite sides of the partition.

Naturally, a cylindrical solid body can be formed as well as the bores drilled in this body.

According to another feature of the invention, a pair of cylindrical-segmental shells or aprons are provided to flank the junctions, either as separate elements or as aprons unitary with the ceramic insulating body. These semishells are thus also composed of ceramic material and can have the outer radii of curvature equal to that of the perforated portion or greater, and inner radii of curvature which are greater than the distance of each bore from the axis plus the radius of the bore. The apron lengths can correspond to the length of the web.

Naturally, when the aprons are formed on the ceramic body by slitting the latter, two parallel slits are provided to flank the web and the bores of the perforated portion lying open at the bases of the slits.

According to still another feature of the invention, the ceramic spacers within the head include at least the following elements:

a ceramic support for the coil or meander in the form of a ceramic body provided with a multiplicity of mutually parallel axially extending bores through which the noise-resistor wire passes alternately in opposite directions with bends between the bases lying along opposite faces of this latter body;

a cover disk of ceramic material for at least the end turned toward the cable, this disk being provided with two passages or bores through which the ends of the noise-resistance wire extend;

the insulating body mentioned previously with its perforated portion and web or partition; and the aprons flanking the junctions which, in turn, flank the web.

The resulting construction, whether encased in a ceramic housing or in a metal sleeve or casing, can be packed with ceramic particles and has been found to be readily fabricated, highly reliable and mechanically stable. It provides readings of high precision when used in conjunction with the circuitry of the patents mentioned previously.

BRIEF DESCRIPTION OF THE DRAWING

The above and other objects, features and advantages of the invention wll become more readily apparent from the following description, reference being made to the accompanying drawing in which.

Figure 1:
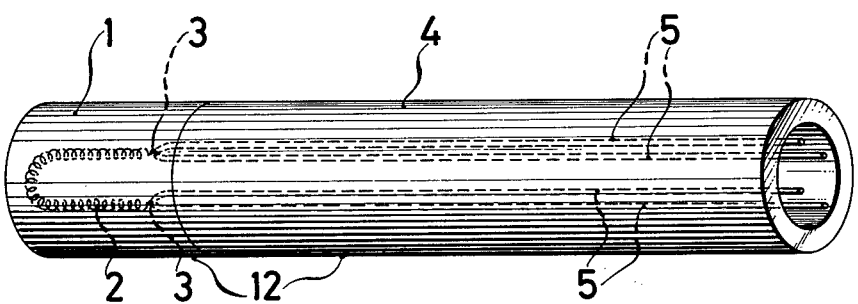
FIG. 1 is a diagrammatic perspective view of a noise thermometer sensor in which two pairs of leads are connected to the thermoresistive element forming a noise-detecting resistor and are connectable to the measuring circuit which can be of the type described in U.S. Pat. No. 3,890,841.
Figures 3, 3A:
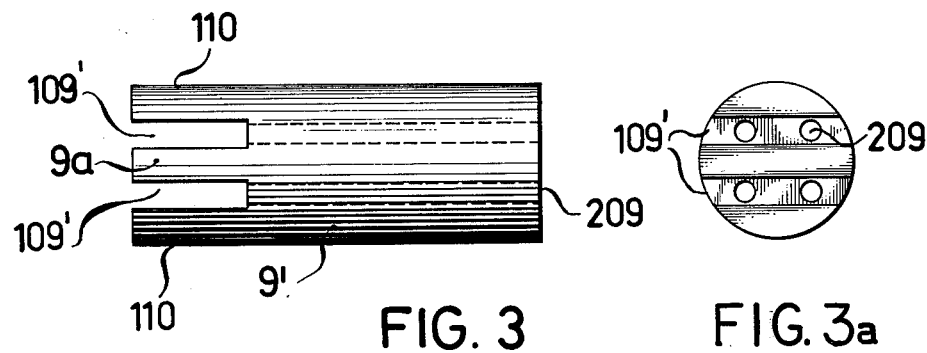

FIG. $1a_1$ is an end view of an apertured separator element of ceramic material receivable in the head of a sensor of the type shown in FIG. 1 to insulate the connections between the thermoelement and the leads from one another;

FIG. $2a_2$ is a cross section through the insulating element of FIG. $2a_1$;

FIG. $2a_3$ is a cross-sectional view through a ceramic member disposed between the element of FIGS. $2a_1$ and $2a_2$ and the body carrying the coil or meander forming the noise resistor;

FIG. $2a_4$ is an end view through another embodiment of the element shown in FIG. $2a_3$;

FIG. $2a_5$ is a cross-sectional view through the element of FIG. $2a_4$;

FIG. $2a_6$ is a cross-sectional view through one embodiment of the ceramic body holding the resistor forming the noise-measuring wire;

FIG. $2a_7$ is an end view of another embodiment of this latter body;

FIG. $2a_8$ is a cross-sectional view through another embodiment of this body;

FIGS. $2a_9$ and $2a_{10}$ are cross-sectional views through ceramic bodies which can be used in the alternative to close the end of a ceramic assembly for a sensor according to the invention;

FIG. $2b_1$ is an end view of a pair of ceramic aprons adapted to flank the connecting locations described above;

FIG. $2b_2$ is an elevational view of these aprons;

FIG. $2c$ is an elevational view of the ceramic housing for the assembly of spacer elements in an embodiment of the invention different from that of FIG. 1;

FIG. $2d_1$ is an end view of the cable portion to be connected to the sensor head;

FIG. $2d_2$ is an elevational view of this cable portion;

FIG. 3 is an elevational view of another spacer body which can be used as a substitute for that of FIGS. $2a_1$ and $2a_2$ and therefore does not require the aprons of FIGS. $2b_1$ and $2b_2$;

FIG. $3a$ is an end view of the spacer body;

FIG. 4 is a partial cross-sectional view through a measuring head utilizing elements of FIG. 1 and various embodiments of the spacer structures; and FIG. 5 is a cross-sectional view similar to FIG. 4 but representing yet another embodiment of the invention.

SPECIFIC DESCRIPTION

As can be seen from the very diagrammatic view in FIG. 1, a noise thermometer temperature sensor of the present invention can have a measuring head 1 provided with a metal wire 2 forming a noise resistor and connected at solder junctions 3 or the like to the two thermocouples (thermoelements) which are formed as junctions between pairs of wires constituting leads 5 running to the measuring circuit and provided in a four-conductor, mineral-insulated cable 4.

Such junctions and the operation are known from the principles set forth in the abovementioned patents.

The metal wire, which has been shown diagrammatically in the form of a coil and can be of any configuration affording a relatively long length in a small space, can have a diameter between 5 microns and 1 mm and can be composed of tungsten, tantalium, niobium, titanium, zirconium or platinum or from an alloy of chromium, nickel and/or iron.

The diameter of the sensor will depend upon its application and can be between 1.5 and 10 mm with a length of the head 1 ranging between 5 and 30 mm.

In the embodiments described below and in the preferred and best mode embodiments of the invention, the noise resistance will be a wire wound back and forth through axially extending passages in a ceramic body through a large number of passes. However, any of the conductor-support structures shown in the aforementioned patents may be used as well, e.g. that of FIG. 4 of U.S. Pat. No. 3,956,936, in which each passage of the body receives a coil.

For guiding and insulating the metal wire and the leads, the measuring head receives a succession of ceramic bodies, sometimes referred to as spacers, which are shown in place in FIGS. 4 and 5 and have been shown in structural detail in FIGS. $2a_1$ through $2a_{10}$.

For example, to support the noise-resistance wire the ceramic body 6 or 6a can be used, each of these bodies having a multiplicity of axially extending passages 106,206, with the wire lying in a meander pattern back and forth through these passages and such that the ends of the wire extend back to the left (see FIG. 4 and FIG. 5).

The tip of the measuring head can be closed by a ceramic disk 7 or 7a. The disk 7a with a recess 107a is used when the end face of the body 6 is planar as is shown in FIG. $2a_8$.

To accommodate the bends of the wire between passes a disk 7 with a planar end face can be used when a recess 206' is provided in each end of the body 6a to accommodate these bends. The disks 7 or 7a can have thicknesses of 1 to 3 mm.

The noise resistance wire also passes through a pair of perforations 108 or 208 in a smooth disk 8 or a raised disk 8a disposed on the opposite side of the body 6 or 6a. Members 8 and 8a, which are axially aligned with the members 6 or 6a and 7 or 7a (FIGS. 4 and 5), serve to hold the wire ends apart and to isolate the portions of the passes bent from passage to passage of the bodies 6 or 6a.

The final ceramic element in the measuring head is the partition body 9 or 9' which is provided with perforations 109 or 209 through which the leads 5 of the cable extend and which is formed with a web 9a or 9a'. The partition 9a or 9a' separates the junctions 3 at which the thermocouples are tied to the ends 13 of the noise-resistance wire from one another. Thus, the members 9 and 9' thus serve to guide and insulate the leads in the region of the junctions and accommodate any loops in the wire which may be provided to relieve stress under the varying thermal conditions to which the thermometer may be subject. In the embodiment of FIGS. $2a_1$, $2a_2$, 4 and 5, the length of the insulating member 9 is about 10, and the length of the web 9a is in a ratio to the axial dimension of the perforated part of substantially 3:1.

To insulate the junctions between the noise resistance metal wire and the leads from the external protective tube, (shown at 12 or 112 in FIGS. 4 and 5), half-shell insulating members 10 as shown in FIGS. $2b_1$ and $2b_2$ are provided, these shells having lengths corresponding to the web 9a of member 9.

FIGS. $2d_1$ and $2d_2$ show the portion of the cable 4 which are intended to extend into and connect to the measuring head (see FIG. 5) while FIG. 2c shows a ceramic insulating casing 11 into which the spacer elements can be fitted. When this casing 11 is used, the parts 7 and 7a as well as the aprons 10 can be omitted (see FIG. 5). All of the free space within the measuring head can be filled with MgO or $Al_2O_3$ powder as represented at 20 in FIGS. 4 and 5.

The insulting body 9' shown in FIG. 3, which can be substituted for the member 9 of FIGS. $2a_1$ and $2a_2$ is formed with an elongated perforated section and a pair of slots 109' defining the web 9a' between them. The bores 209 open within the slots 109' and at the passes thereof (see FIG. 3a). This construction eliminates the need for separate aprons 10 since the projecting portions 110 fulfill the same function.

This embodiment is particularly advantageous when the leads 5 do not form part of a cable, but rather are individual members fed through the bores 209.

The wires are drawn through the bores 209 and the body 9' until their ends to be connected to form the junctions lie beyond the body. Once the junctions are formed, the wires are retracted so that their junctions lie in the slits 109'.

We claim:

1. A noise thermometer temperature sensor comprising:
    a housing forming a measuring head;
    a noise-thermometer resistance wire received in said head and having a pair of ends forming junctions with respective leads; and
    an axially elongated rigid solid ceramic insulator formed by at least one insulating ceramic body in said head, said body being formed with a perforated portion having a plurality of passages respectively traversed by said leads and a web extending axially from said portion toward said noise-thermometer resistance wire between said junctions, said web being formed in one piece with said portion, said leads including paired thermoelement conductors with each pair of conductors joined in a respective thermocouple at a respective junction, said passages being formed in said body in pairs spaced on either side of said web and traversed by the respective pairs of conductors, said portion thereby having four of said passages, said web being disposed between said thermocouples.

2. The noise thermometer temperature sensor defined in claim 1 wherein said leads extend from the cable connected to said head, said portion being disk-shaped, said web having a length whose ratio to the axial length of said portion is substantially 3:1.

3. The noise thermometer temperature sensor defined in claim 2, further comprising a pair of shell members of a length equal to the length of said web flanking said junctions.

4. The noise thermometer temperature sensor defined in claim 1 wherein said portion is elongated and said body is formed with a pair of slits defining said web between them and respective aprons outwardly of said web, said passages opening in said slits.

5. The noise thermometer temperature sensor defined in claim 1, claim 2, claim 3 or claim 4, further comprising:

a ceramic support received in said housing and carrying said wire, said support being formed with a multiplicity of axially extending parallel bores traversed by said wire in passes extending in opposite directions, two ends of said wire extending from said support to said junction;

a ceramic disk interposed between said support and said web and provided with respective bores traversed by said ends of said wire, said support, said body and said disk defining within said housing a space; and a mass of insulating particles filling said space.

* * * * *